(12) United States Patent
Miyata et al.

(10) Patent No.: US 7,735,469 B2
(45) Date of Patent: Jun. 15, 2010

(54) INTERNAL COMBUSTION ENGINE CONTROLLER

(75) Inventors: Toshiyuki Miyata, Okazaki (JP); Katsunori Ueda, Okazaki (JP); Koji Kawakita, Ohbu (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/347,609

(22) Filed: Dec. 31, 2008

(65) Prior Publication Data

US 2009/0210135 A1  Aug. 20, 2009

(30) Foreign Application Priority Data

Feb. 15, 2008 (JP) .......................... P.2008-035231

(51) Int. Cl.
*F02D 11/10* (2006.01)
(52) U.S. Cl. .................. 123/399; 123/683; 123/435
(58) Field of Classification Search ................. 123/399, 123/1 A, 198 A, 575, 431, 527, 683, 435; 701/103
See application file for complete search history.

(56) References Cited

U.S. PATENT DOCUMENTS

| | | | | |
|---|---|---|---|---|
| 5,088,350 A | * | 2/1992 | Kurihara et al. | 477/120 |
| 5,183,021 A | * | 2/1993 | Suga et al. | 123/478 |
| 5,188,087 A | * | 2/1993 | Saito | 123/568.21 |
| 5,197,450 A | * | 3/1993 | Kitajima et al. | 123/685 |
| 5,327,866 A | * | 7/1994 | Kitajima | 123/406.47 |
| 2008/0270005 A1 | * | 10/2008 | Tooyama | 701/103 |
| 2009/0024304 A1 | * | 1/2009 | Takubo | 701/103 |
| 2009/0030588 A1 | * | 1/2009 | Yamashita | 701/103 |
| 2009/0112443 A1 | * | 4/2009 | Kawamura et al. | 701/103 |
| 2009/0205613 A1 | * | 8/2009 | Kawakita et al. | 123/406.44 |
| 2009/0210134 A1 | * | 8/2009 | Miyata et al. | 701/103 |
| 2009/0210138 A1 | * | 8/2009 | Hokuto et al. | 701/103 |
| 2009/0314267 A1 | * | 12/2009 | Kawai et al. | 123/674 |

FOREIGN PATENT DOCUMENTS

| | | | |
|---|---|---|---|
| JP | 56-141033 | * | 11/1981 |
| JP | 4-128525 A | | 4/1992 |
| JP | 2009-133245 | * | 6/2009 |

* cited by examiner

*Primary Examiner*—Hai H Huynh
(74) *Attorney, Agent, or Firm*—Birch, Stewart, Kolasch & Birch, LLP

(57) ABSTRACT

A controller of an internal combustion engine operable by an alcohol-containing fuel includes: an alcohol concentration detecting unit, operable to detect an alcohol concentration of the alcohol-containing fuel; and a suppressing unit, operable to suppress a degree of change of an intake air amount of the internal combustion engine when the alcohol concentration, detected by the alcohol concentration detecting unit, is higher than a concentration.

8 Claims, 6 Drawing Sheets

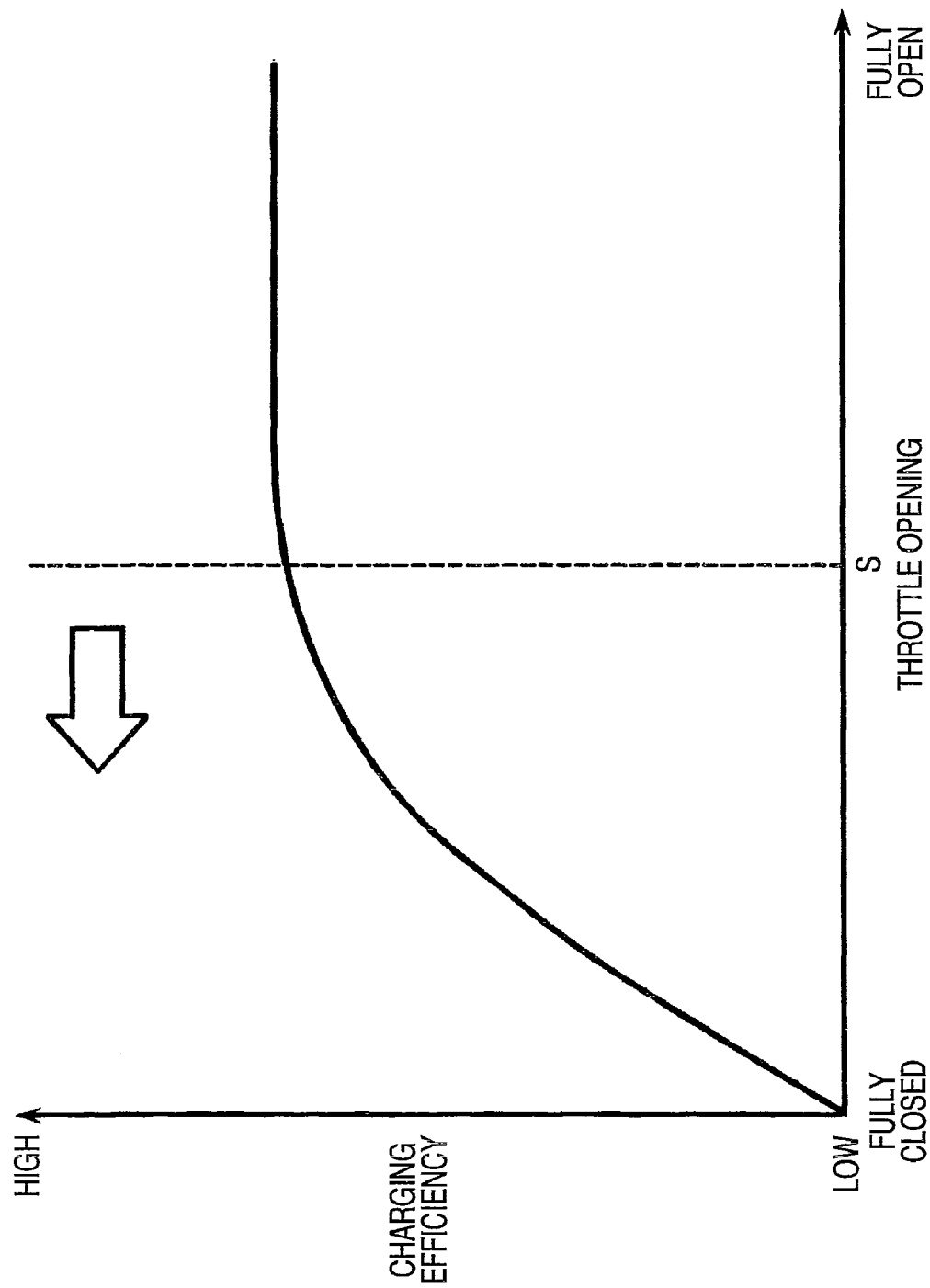

INTERNAL COMBUSTION ENGINE CONTROLLER

BACKGROUND OF THE INVENTION

1. Field of the Invention

The present invention relates to a controller of an internal combustion engine operable by an alcohol-containing fuel.

2. Description of the Related Art

Gasoline is used as a fuel in an internal combustion engine (engine) of an automobile or other vehicle. Meanwhile, there is a vehicle (FFV: Flexible Fuel Vehicle) in which is installed an engine enabled to use, in addition to gasoline, alcohol as an alternate fuel mixed at any ratio (0% to 100%).

The ratio of gasoline and alcohol (alcohol concentration; blend ratio) of a blended fuel supplied to an engine for FFV is not necessarily constantly fixed. For example, there may be a case where, in a state in which a blended fuel with an alcohol concentration of 80% is stored in a fuel tank of an FFV, a fuel of 0% alcohol concentration (that is, a fuel of 100% gasoline concentration) is supplied or a fuel of 100% alcohol concentration (that is, a fuel of 0% gasoline concentration) is supplied. Normally, the amount supplied also differs each time.

With an engine using a blended fuel, by ascertaining the alcohol concentration in the blended fuel, a fuel injection amount can be adjusted appropriately according to characteristics of the blended fuel. Due to such circumstances, there is an art, for example, of changing a target engine rotation speed according to the alcohol concentration when fuel injection is stopped during vehicle deceleration (see JP-A-4-128525).

Alcohol has a characteristic of vaporizing less readily (being lower in volatility) at a low temperature in comparison to gasoline. For example, whereas gasoline has a boiling point of 25° C. to 210° C., alcohol (ethanol) has a boiling point of 78° C. Thus, whereas when gasoline is used as the fuel, a characteristic of vaporizing constantly from a low temperature region to a high temperature region is exhibited, when ethanol is used as the fuel, a characteristic of hardly vaporizing up to a temperature of 78° C. and becoming high in vaporization amount when the boiling point is exceeded is exhibited.

The art described in JP-A-4-128525 takes note of the characteristic of alcohol of vaporizing less readily (the characteristic of low evaporativity) in comparison to gasoline and in performing control of fuel stoppage, the engine rotation speed is adjusted to be high when the alcohol concentration is high.

Because alcohol is low in volatility at a low temperature, when a blended fuel is used, a large amount of the blended fuel becomes adhered to an intake port and a valve head. There are thus cases where, when an intake air amount changes during acceleration or deceleration, the blended fuel adhered to the intake port and the valve head causes a supply of the blended fuel to become delayed during acceleration and an acceleration lean state to be entered, and an excess amount of the blended fuel to be supplied during deceleration and a deceleration rich state to be entered even in a state where a correction for the adhesion is implemented (a control of estimating a fuel transport delay due to the adhesion and compensatingly lessening the fuel injection amount).

For example, in rapid deceleration in a state where large amounts of the blended fuel are adhered to the intake port and the valve head, because the fuel injection amount is set with the adhesion correction being added to the fuel amount that is in accordance with a decrease in the intake air amount, the target fuel amount may conceivably be set to zero or a negative value. This means that although the supply of fuel from a fuel injection valve is stopped, the large amounts of the blended fuel adhered to the intake port and the valve head vaporize and become fed excessively into an engine cylinder. There are thus cases where, in rapid deceleration, the fuel amount supplied into the cylinder becomes excessive and an air-fuel ratio changes to a rich side with respect to a target air-fuel ratio.

Also, in rapid acceleration in a state where large amounts of the blended fuel are adhered to the intake port and the valve head, the fuel injection amount is set with the adhesion correction being added to the fuel amount that is in accordance with an increase in the intake air amount, and because alcohol is low in volatility, the adhered blended fuel may not vaporize adequately by an end of an intake stroke. There are thus cases where, in rapid acceleration, the fuel amount supplied into a cylinder decreases and the air-fuel ratio changes to a lean side with respect to the target air-fuel ratio.

Actual circumstances are thus such that, with an FFV engine, in transient periods in rapid acceleration and rapid deceleration, there are cases where a change of the air-fuel ratio becomes large and lead to misfire or degradation of exhaust gas performance. Such circumstances are especially significant in a cold state.

SUMMARY OF THE INVENTION

It is therefore an object of the invention to provide in an internal combustion engine operable by a fuel, containing alcohol, which does not vaporize readily, an internal combustion engine controller that can suppress influences of volatility of the fuel to suppress changes of air-fuel ratio in transient periods in rapid acceleration and rapid deceleration.

In order to achieve the object, according to the invention, there is provided a controller of an internal combustion engine operable by an alcohol-containing fuel, the controller comprising:

an alcohol concentration detecting unit, operable to detect an alcohol concentration of the alcohol-containing fuel; and a suppressing unit, operable to suppress a degree of change of an intake air amount of the internal combustion engine when the alcohol concentration, detected by the alcohol concentration detecting unit, is higher than a concentration.

The controller may further comprise: a temperature state detecting unit, operable to detect a temperature state of the internal combustion engine. The suppressing unit may suppress the degree of change of the intake air amount when the temperature state detecting unit detects the temperature state to be a cold state.

The suppressing unit may comprise: a throttle valve, adapted to perform an opening/closing operation to open or close an air intake system passage of the internal combustion engine in accordance with an accelerator opening; and a limiting unit, operable to slow down the opening/closing operation of the throttle valve.

The limiting unit may slow down the opening/closing operation of the throttle valve in a region where an opening of the throttle valve is no more than an opening.

The suppressing unit may slow down the degree of change of the intake air amount as the alcohol concentration increases.

The alcohol concentration detecting unit may comprise: an air-fuel ratio detecting unit, operable to detect an exhaust air-fuel ratio of the internal combustion engine; and an estimating unit, operable to estimate the alcohol concentration based on the exhaust air-fuel ratio detected by the air-fuel ratio detecting unit.

BRIEF DESCRIPTION OF THE DRAWINGS

FIG. 4 is a graph of a control region.

DETAILED DESCRIPTION OF THE INVENTION

A configuration of an internal combustion engine controller shall now be described based on FIG. 1.

Figure 1:
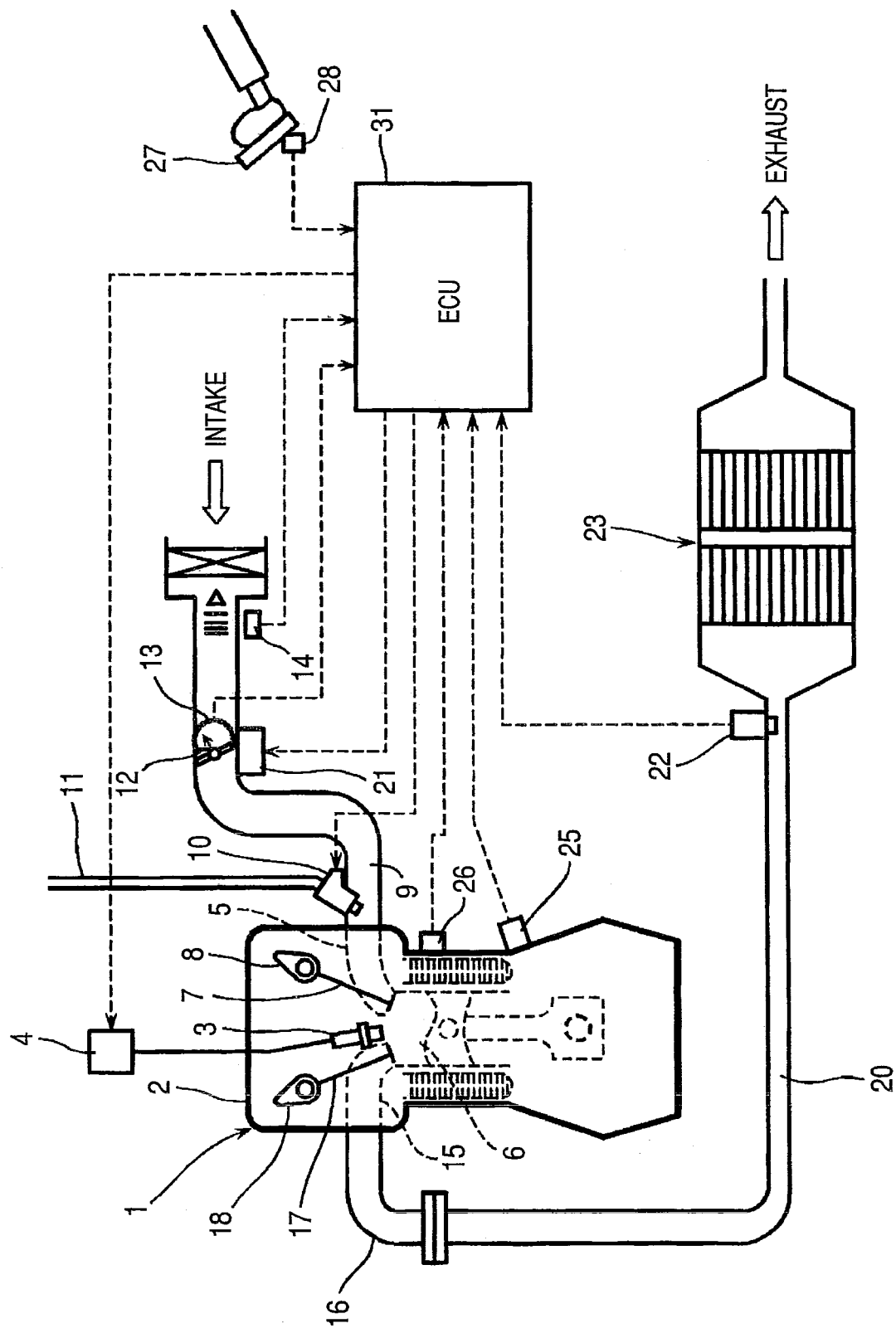
FIG. 1 is a schematic configuration diagram of an internal combustion engine including a controller according to an embodiment of the present invention.

As shown in FIG. 1, in a cylinder head 2 of an engine 1, which is an internal combustion engine mounted in an FFV, a spark plug 3 is mounted according to each cylinder, and an ignition coil 4, outputting a high voltage, is connected to each spark plug 3. In the cylinder head 2, an intake port 5 is formed according to each cylinder, and an intake valve 7 is disposed at a combustion chamber 6 side of each intake port 5. The intake valve 7 is actuated to open and close in accordance with a cam of a cam shaft 8, rotating according to an engine rotation speed, and thereby communicates and interrupts the intake port 5 and the combustion chamber 6.

One end of an intake manifold 9 is connected to and put in communication with each intake port 5. A solenoid fuel injection valve 10 is mounted on the intake manifold 9 in correspondence to each cylinder, and the fuel injection valve 10 is connected to a fuel pipe 11. The fuel pipe 11 is connected to an unillustrated fuel supplying device that supplies a blended fuel, containing alcohol (ethanol) and gasoline, from an unillustrated fuel tank.

On an intake tube at an upstream side of the intake manifold 9 are disposed a throttle valve 12, which is driven by an electrical actuator 21 to open and close an intake passage (air intake system passage), and a throttle position sensor 13, detecting a valve opening (throttle opening) of the throttle valve 12. An accelerator position sensor 28, detecting a stepped condition (accelerator opening) of an accelerator pedal 27, is provided, and the throttle valve 12 is driven to open and close according to detection information of the accelerator position sensor 28.

At an upstream side of the throttle valve 12 is disposed an air flow sensor 14, measuring an intake air amount. As the air flow sensor 14, for example, a Karman vortex type or hot film type air flow sensor is used.

Meanwhile, in the cylinder head 2, an exhaust port 15 is formed according to each cylinder, and an exhaust valve 17 is disposed at the combustion chamber 6 side of each exhaust port 15. The exhaust valve 17 is actuated to open and close according to a cam of a cam shaft 18, rotating in accordance with the engine rotation speed, and thereby communicates and interrupts the exhaust port 15 and the combustion chamber 6. One end of an exhaust manifold 16 is connected to each exhaust port 15, and each exhaust port 15 is thereby put in communication with the exhaust manifold 16. Because such an intake tube injection type multi-cylinder gasoline engine is known, details of the configuration are omitted.

An exhaust pipe (exhaust passage) 20 is connected to the other end of the exhaust manifold 16, and an exhaust purifying catalyst 23 is disposed in the exhaust pipe 20. On the exhaust pipe 20 at an upstream side of the exhaust purifying catalyst 23, an air-fuel ratio sensor 22 is disposed as an air-fuel ratio detecting unit, and an exhaust air-fuel ratio is detected by the air-fuel ratio sensor 22. The exhaust air-fuel ratio is detected by the air-fuel ratio sensor 22, and a fuel injection amount is feedback controlled with respect to the detected exhaust air-fuel ratio. An alcohol concentration of the blended fuel is estimated according to the fuel injection amount at this time (estimating unit).

Because the alcohol concentration is not constantly fixed and because fuel characteristics change according to the alcohol concentration (blend ratio), when a blended fuel is used, the alcohol concentration must be ascertained. Because alcohol (ethanol) has an energy density of approximately ⅔ that of gasoline, to obtain an air-fuel ratio equivalent to that for gasoline, the fuel injection amount must be increased by approximately 1.5 times. Because the alcohol concentration can thus be estimated from the fuel injection amount when the exhaust air-fuel ratio is feedback controlled to a stoichiometric air-fuel ratio, the alcohol concentration can be ascertained based on the exhaust air-fuel ratio (alcohol concentration detecting unit).

As the air-fuel ratio sensor 22, an $O_2$ sensor or a linear air-fuel ratio sensor (LAFS) can be used.

An ECU (electronic control unit) 31 includes an input/output device, a memory device (ROM, RAM, etc.), a central processing unit (CPU), a timer counter, etc. By the ECU 31, comprehensive control of the controller, including the engine 1, is performed.

In addition to the throttle position sensor 13, the air flow sensor 14, and the air-fuel ratio sensor 22, various sensors, including a crank angle sensor 25, detecting a crank angle of the engine 1, a water temperature sensor 26 (temperature state detecting unit), detecting a temperature of a cooling water of the engine 1 (detecting a temperature state), etc., are connected to and detection information from these sensors are input into an input side of the ECU 31. The engine rotation speed is determined based on the information from the crank angle sensor 25, and a cold state of the engine 1 is determined (detected) based on the information from the water temperature sensor 26.

Meanwhile, the fuel injection valve 10, the ignition coil 4, the throttle valve 12, and various other output devices are connected to an output side of the ECU 31. A fuel injection time, an ignition timing, etc., are computed by the ECU 31 based on the detection information from the various sensors and respectively output to the various output devices. That is, based on the detection information from the various sensors, the air-fuel ratio is set in accordance with the alcohol concentration of the blended fuel to an appropriate target air-fuel ratio (target A/F), and based on the information from the air-fuel ratio sensor 22, feedback control is performed.

That is, the blended fuel of an amount in accordance with the target A/F is injected at an appropriate timing from the fuel injection valve 10, and the throttle valve 12 is adjusted to an appropriate opening and spark ignition is performed at an appropriate timing by the spark plug 3. The alcohol concentration of the blended fuel is estimated and ascertained based on the fuel injection amount when the exhaust air-fuel ratio, obtained from the information from the air-fuel ratio sensor 22, feedback controlled to the stoichiometric air-fuel ratio.

With the engine 1, according to the present embodiment, when the alcohol concentration is higher than a predetermined concentration, driving of the electrical actuator 21 is limited to slow down the opening/closing operation of the throttle valve 12 (limiting unit) and a change of the intake air amount is thereby suppressed (suppressing unit). That is, even in a case where a blended fuel, containing alcohol which is not vaporized readily, is used, influences of the blended fuel adhered to the intake port 5 (valve head of the intake valve 7) are suppressed to enable operation at a fuel injection amount that is in accordance with the intake air amount regardless of the alcohol concentration. Influences of volatility of the blended fuel can thus be suppressed to suppress changes of the air-fuel ratio in transient periods in rapid acceleration and rapid deceleration, and misfire or degradation of exhaust gas performance can thereby be suppressed.

Figure 2:
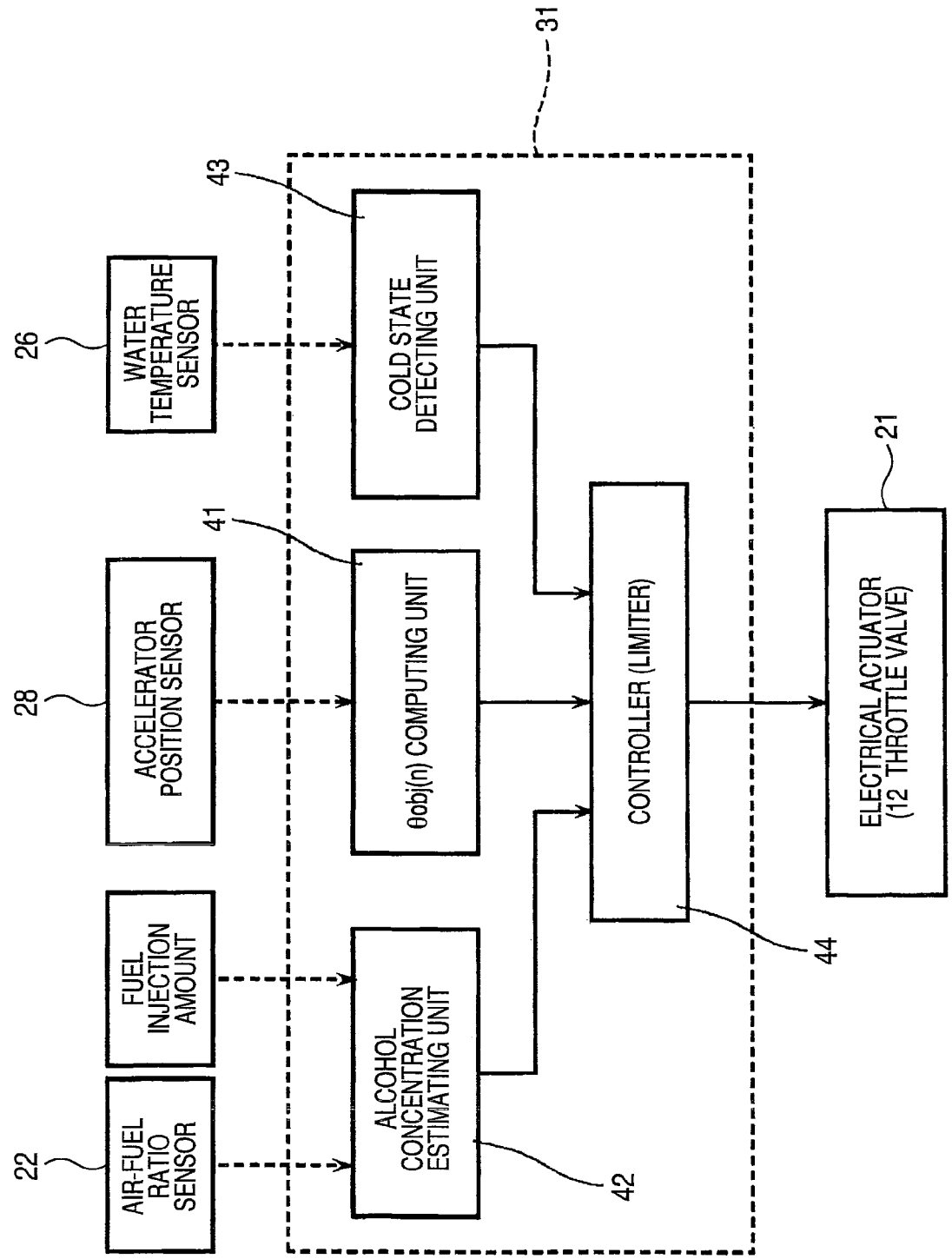
FIG. 2 is a system diagram of principal portions of the controller.

That is, as shown in FIG. 2, the ECU 31 includes a θobj(n) computing unit 41, computing a target throttle opening θobj(n) upon input of information from the accelerator position sensor 28, an alcohol concentration estimating unit 42, estimating the alcohol concentration upon input of information from the air/fuel ratio sensor 22 and information on the fuel injection amount, and a cold state detecting unit 43, detecting a cold state of the engine 1 upon input of information from the water temperature sensor 26.

The ECU 31 also includes a suppressor (limiter) 44, outputting a drive command to the electrical actuator 21 to slow down the opening/closing operation of the throttle valve 12 based on the target throttle opening θobj(n), computed by the θobj(n) computing unit 41, the alcohol concentration result, estimated by the alcohol concentration estimating unit 42, and the cold state result of the engine 1, detected by the cold state detecting unit 43.

Circumstances of the above-described intake air amount suppression control in engine 1 shall now be described in detail based on FIGS. 3 to 5E.

Figure 3:
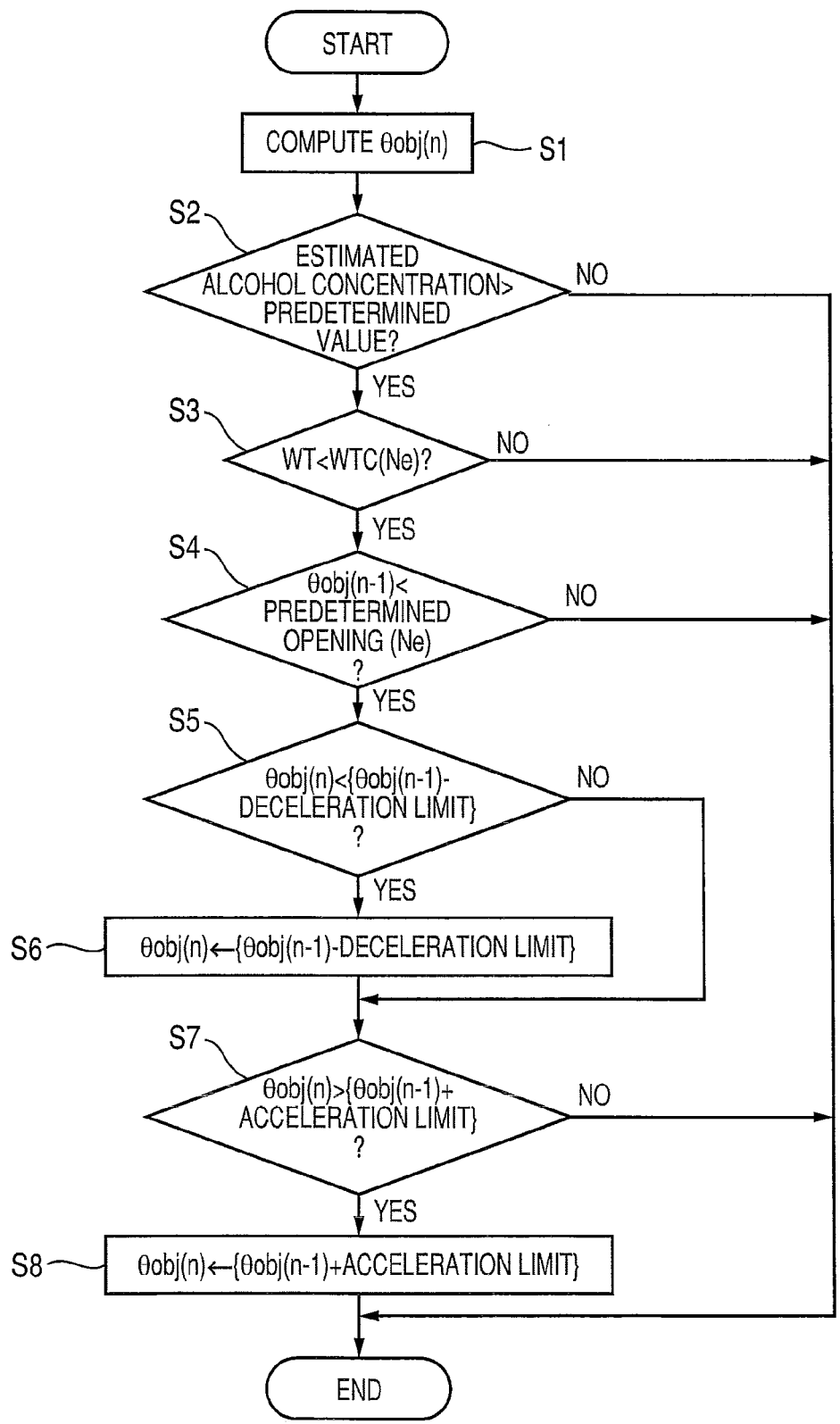
FIG. 3 is a flowchart of intake air amount suppression control.

As shown in FIG. 3, the target throttle opening θobj(n) is computed in step S1 and in step S2, it is determined whether or not the estimated alcohol concentration exceeds the predetermined value, that is, whether or not the alcohol concentration is higher than the predetermined value at which there is a need to suppress the change of the intake air amount. If, in step S2, it is determined that the estimated alcohol concentration exceeds the predetermined value, it is determined in step S3 whether or not a detected value WT of the water temperature sensor 26 is lower than a predetermined water temperature WTC, that is, whether or not operation is being performed in a cold state. If, in step S3, it is determined that the detected value WT is lower than the predetermined water temperature WTC, it is determined in step S4 whether or not a previous target throttle opening θobj(n−1) is lower than a predetermined opening that is in accordance with the engine rotation speed.

Although with the above-described embodiment, the cold state of the engine 1 (see FIG. 1) is determined in step S3 by comparing the detected value WT of the water temperature sensor 26 and the predetermined water temperature WTC, the cold state can be determined instead by accumulating a time from a start of operation or from other operation condition. The judgment of the cold state may also be omitted.

As shown in FIG. 4, with a general engine, although in an interval between fully closed and fully open throttle opening states, a charging efficiency of an air intake system increases up to a predetermined opening S, beyond the predetermined opening S, the charging efficiency hardly increases even when the throttle opening increases. Thus with the present embodiment, in step S4, it is determined whether or not the previous target throttle opening θobj(n−1) is lower than the predetermined opening S that is in accordance with the engine rotation speed, and if the previous target throttle opening θobj(n−1) is lower, suppression control of the intake air amount is performed in a region, in which the throttle valve 12 (see FIG. 1) is set to no more than the predetermined opening S.

If, in step S2, it is determined that the estimated alcohol concentration does not exceed the predetermined value, because the alcohol concentration is such that the suppression of the change of the intake air amount is not required, the control is ended (the intake air amount suppression control is not performed). Also, if, in step S3, it is determined that the detected value WT of the water temperature sensor 26 is not lower than the predetermined water temperature WTC, because operation is not being performed in the cold state, the control is ended (the intake air amount suppression control is not performed). Furthermore, if, in step S4, it is determined that the previous target throttle opening θobj(n−1) is not lower than the predetermined opening that is in accordance with the engine rotation speed, because the throttle opening exceeds the predetermined opening and is in the region where hardly any increase or decrease in the charging efficiency occurs, the control is ended (the intake air amount suppression control is not performed).

Returning to the process of step S4, if it is determined that the previous target throttle opening θobj(n−1) is smaller than the predetermined opening that is in accordance with the engine rotation speed, that is, it is determined that the throttle opening is in the region where the increase or decrease in the charging efficiency is large, it is then determined in step S5 whether or not the target throttle opening θobj(n) is less than a value obtained by subtracting a deceleration limit per unit time from the previous target throttle opening θobj(n−1).

That is, it is determined whether or not the current state is a rapidly decelerating state, in which the target throttle opening θobj(n) is greatly lowered with respect to the previous target throttle opening θobj(n−1) (a state of decelerating beyond a dead band). If, in step S5, it is determined that the current state is the rapidly decelerating state, the drive command is output to the electrical actuator 21 with the target throttle opening θobj(n) being set to the value obtained by subtracting the deceleration limit per unit time from the previous target throttle opening θobj(n−1) (step S6).

On the other hand, if, in step S5, it is determined that the current state is not the rapidly decelerating state (dead band or accelerating state), step S7 is executed, and it is determined whether or not the target throttle opening θobj(n) is greater than a value obtained by adding an acceleration limit per unit time to the previous target throttle opening θobj(n−1). That is, it is determined whether or not the present state is a rapidly accelerating state, in which the target throttle opening θobj(n) is greatly increased with respect to the previous target throttle opening θobj(n−1) (state of accelerating beyond the dead band). If, in step S7, it is determined that the present state is the rapidly accelerating state, the drive command is output to the electrical actuator 21 with the target throttle opening θobj(n) being set to the value obtained by adding the acceleration limit per unit time to the previous target throttle opening θobj(n−1) (step S8).

Although the deceleration limit and the acceleration limit are set per unit time, further adjustment according to the engine rotation speed may also be applied.

Figure 5A:
FIGS. 5A to 5E are timing charts of intake air amount suppression control in deceleration.
Figure 5B:

That is, in regard to a rapidly decelerating state, when, as shown in FIG. 5A, the accelerator opening changes to a closing side from a time t1, the target throttle opening θobj(n) and the previous target throttle opening θobj(n−1) are compared and in the case of the rapidly decelerating state, the target throttle opening θobj(n) is limited to the value obtained by subtracting the deceleration limit per unit time from the previous target throttle opening θobj(n−1) (time t2), and the change of the throttle opening is suppressed and the target throttle opening θobj(n) is controlled toward the closing side until a time t3 as indicated by a solid line in FIG. 5B.

Figure 5C:
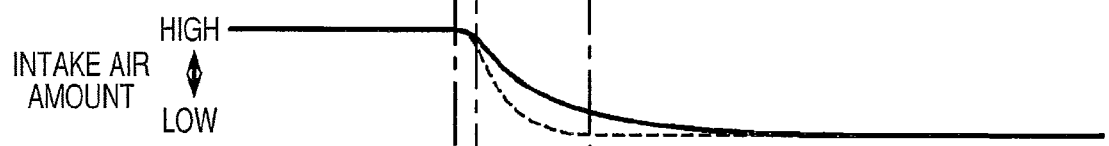
Figure 5D:
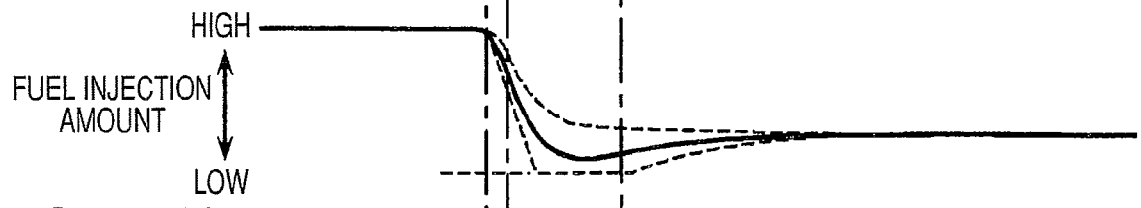
Figure 5E:
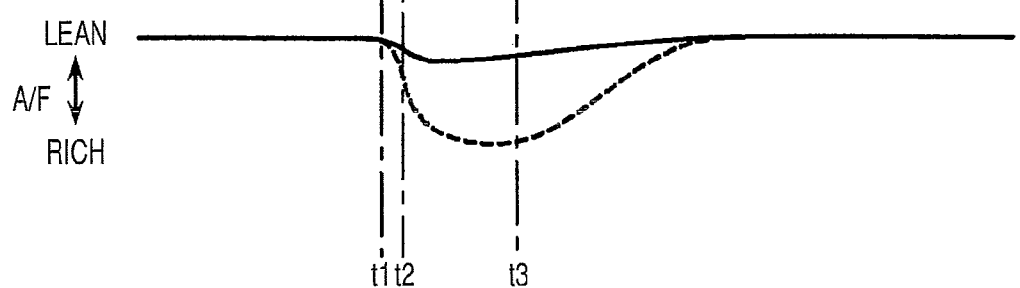

The intake air amount thus decreases gradually as indicated by a solid line in FIG. 5C, the target fuel injection amount decreases without falling below zero as indicated by a solid line in FIG. 5D, and hardly any change of the air-fuel ratio A/F occurs as indicated by a solid line in FIG. 5E. That is, in a cold state in which a blended fuel, containing alcohol that does not vaporize readily, is being used, even if the accelerator opening is decreased rapidly, the decrease in the intake air amount is suppressed (the degree of change of the intake air amount is suppressed) and the target fuel injection amount is set in a state where the blended fuel, adhered to the intake port 5 (valve head of the intake valve 7, see FIG. 1 in regard to both), vaporizes. The influence of the blended fuel that does not vaporize readily is thus suppressed to enable operation at the fuel injection amount that is in accordance with the intake air amount.

It thus becomes possible in a rapidly decelerating operation in the cold state to suppress the influence of the volatility of the blended fuel and suppress the change of the air-fuel ratio even when the alcohol concentration is high.

If the target throttle opening θobj(n) is not limited in the rapidly decelerating operation, the throttle opening follows the accelerator opening as indicated by a dotted line in FIG. 5B and becomes closed before the time t3 is reached. The intake air amount decreases rapidly as indicated by a dotted line in FIG. 5C, and the target fuel injection amount becomes zero as indicated by a dotted line in FIG. 5D. When in the cold state, the blended fuel, containing alcohol that does not vaporize readily, is used, even when the target fuel injection amount becomes zero (even when fuel injection is stopped), because the amount of fuel adhered to the intake port 5 is large, fuel transport into a cylinder continues due to vaporization from the adhered fuel, the air-fuel ratio A/F changes to a rich side, and the air-fuel ratio is maintained in the rich state as indicated by a dotted line in FIG. 5E. The states indicated by the dotted lines in FIGS. 5B to 5E are states in the case where normal adhesion correction is added.

Figure 6A:
FIGS. 6A to 6E are timing charts of intake air amount suppression control in acceleration.
Figure 6B:
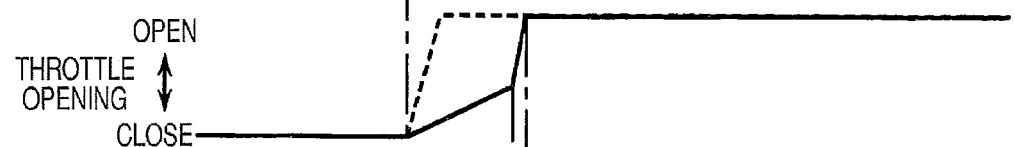

In regard to a rapidly accelerating state, when, as shown in FIG. 6A, the accelerator opening changes to an opening side from a time t1, the target throttle opening θobj(n) and the previous target throttle opening θobj(n−1) are compared, and in the case of the rapidly accelerating state, the target throttle opening θobj(n) is limited to the value obtained by adding the acceleration limit per unit time to the previous target throttle opening θobj(n−1) (time t2) and the change of the throttle opening is suppressed and the target throttle opening θobj(n) is controlled toward the opening side until a time t3 as indicated by a solid line in FIG. 6B.

Figure 6C:
Figure 6D:
Figure 6E:
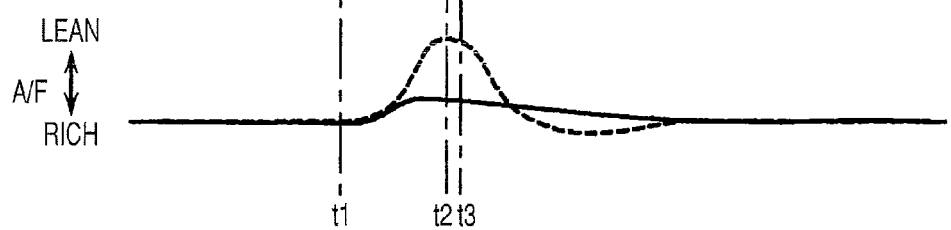

The intake air amount thus increases gradually as indicated by a solid line in FIG. 6C, the target fuel injection amount decreases as indicated by a solid line in FIG. 6D, and hardly any change of the air-fuel ratio A/F occurs as indicated by a solid line in FIG. 6E. That is, in a cold state in which a blended fuel, containing alcohol that does not vaporize readily, is being used, even if the accelerator opening is increased rapidly, the rapid increase in the intake air amount is suppressed (the degree of change of the intake air amount is suppressed) and the target fuel injection amount is set in a state where the blended fuel, adhered to the intake port 5 (valve head of the intake valve 7, see FIG. 1 in regard to both), vaporizes. The intake air amount thus does not increase, the air-fuel ratio is not put in a lean state with respect to the target air-fuel ratio, and the blended fuel is vaporized adequately until the end of the intake stroke to enable operation at the fuel injection amount that is in accordance with the intake air amount.

It thus becomes possible in a rapidly accelerating operation in the cold state to suppress the influence of the volatility of the blended fuel and suppress the change of the air-fuel ratio even when the alcohol concentration is high.

If the target throttle opening θobj(n) is not limited in the rapidly accelerating operation, the throttle opening follows the accelerator opening as indicated by a dotted line in FIG. 6B and becomes open before the time t3 is reached. The intake air amount increases rapidly as indicated by a dotted line in FIG. 6C, and the target fuel injection amount becomes high as indicated by a dotted line in FIG. 6D. Thus, for the fuel injection amount (fuel transport) corresponding to a region indicated by slanted lines in FIG. 6D, the injection occurs subsequent the intake stroke and the fuel is not supplied into a cylinder, and when in the cold state, the blended fuel, containing alcohol that does not vaporize readily, is used, the intake air amount becomes high as indicated by the dotted line in FIG. 6C without the fuel vaporizing adequately by the end of air intake, and as indicated by a dotted line in FIG. 6E, time is taken for the air-fuel ratio to change to the lean side and converge. The states indicated by the dotted lines in FIGS. 6B to 6E are states in which a normal adhesion correction is added.

It thus becomes possible in a rapidly accelerating operation in the cold state to suppress the influence of the volatility of the blended fuel and suppress the change of the air-fuel ratio even when the alcohol concentration is high.

Because with the engine 1 described above, the driving of the electrical actuator 21 is limited to slow down the opening/closing operation of the throttle valve 12 to thereby suppress the degree of change of the intake air amount when the alcohol concentration is higher than the predetermined concentration, even when the blended fuel, containing alcohol that is not readily vaporized, is used, the influences of the blended fuel adhered to the intake port 5 (valve head of the intake valve 7) can be suppressed to enable operation at the fuel injection amount that is in accordance with the intake air amount regardless of the alcohol concentration. The influences of volatility of the blended fuel can thus be suppressed to suppress changes of the air-fuel ratio in transient periods in rapid acceleration and rapid deceleration and misfire and degradation of exhaust gas performance can thereby be suppressed.

According to an aspect of the invention, the degree of change of the intake air amount is suppressed when the alcohol concentration of the alcohol-containing fuel is higher than the predetermined concentration to enable operation at a fuel injection amount that is in accordance with the intake air amount regardless of the concentration of alcohol, which does not vaporize readily. Thus, in the internal combustion engine operable by a fuel, containing alcohol, which does not vaporize readily, influences of volatility of the fuel can be suppressed to suppress changes of the air-fuel ratio in transient periods in rapid acceleration and rapid deceleration, and misfire or degradation of exhaust gas performance can thus be suppressed.

The alcohol concentration detecting unit is not limited to a configuration that detects the alcohol concentration directly but refers collectively to detecting units, including units that estimate the alcohol concentration according to operation conditions, etc. As the predetermined alcohol concentration used in making a determination in suppressing the degree of change of the intake air amount, a threshold value may be set as an absolute value or a value that varies according to a relationship with another parameter can be set. In regard to the suppression of the degree of change of the intake air amount, preferably, an intake air amount per time is suppressed and a rotation speed of the internal combustion engine can be added to a suppression condition of the intake air amount.

According to an aspect of the invention, the degree of change of the intake air amount can be suppressed in a low temperature region in which the alcohol-containing fuel does not vaporize readily.

According to an aspect of the invention, by slowing down the throttle valve opening/closing operation, the degree of change of the intake air amount can be suppressed.

According to an aspect of the invention, by slowing down the throttle valve opening/closing operation in the region of no more than the predetermined opening, in which a change of the intake air amount with respect to opening is large, the degree of change of the intake air amount can be suppressed reliably.

According to an aspect of the invention, the suppression of the degree of change of the intake air amount can be performed according to the alcohol concentration.

According to an aspect of the invention, because the alcohol concentration is estimated based on the exhaust air-fuel ratio, the alcohol concentration can be estimated with high precision while suppressing increase in cost.

The internal combustion engine controller according to the present invention can suppress, in an internal combustion engine operable by an alcohol-containing fuel, changes of air-fuel ratio in transient periods in rapid acceleration and rapid deceleration and can thereby suppress misfire and degradation of exhaust gas performance.

The present invention can be used in an industrial field of a controller of an internal combustion engine operable by an alcohol-containing fuel.

What is claimed is:

1. A controller of an internal combustion engine operable by an alcohol-containing fuel, the controller comprising:
   an alcohol concentration detecting unit, operable to detect an alcohol concentration of the alcohol-containing fuel; and
   a suppressing unit, operable to suppress a degree of change of an intake air amount of the internal combustion engine when the alcohol concentration, detected by the alcohol concentration detecting unit, is higher than a concentration.

2. The controller according to claim 1, further comprising:
   a temperature state detecting unit, operable to detect a temperature state of the internal combustion engine,
   wherein the suppressing unit suppresses the degree of change of the intake air amount when the temperature state detecting unit detects the temperature state to be a cold state.

3. The controller according to claim 1, wherein the suppressing unit comprises:
   a throttle valve, adapted to perform an opening/closing operation to open or close an air intake system passage of the internal combustion engine in accordance with an accelerator opening; and
   a limiting unit, operable to slow down the opening/closing operation of the throttle valve.

4. The controller according to claim 3, wherein the limiting unit slows down the opening/closing operation of the throttle valve in a region where an opening of the throttle valve is no more than an opening.

5. The controller according to claim 1, wherein the suppressing unit slows down the degree of change of the intake air amount as the alcohol concentration increases.

6. The controller according to claim 1, wherein the alcohol concentration detecting unit comprises:
   an air-fuel ratio detecting unit, operable to detect an exhaust air-fuel ratio of the internal combustion engine; and
   an estimating unit, operable to estimate the alcohol concentration based on the exhaust air-fuel ratio detected by the air-fuel ratio detecting unit.

7. The controller according to claim 1, wherein the suppressing unit increases or reduces the intake air amount of the internal combustion engine by predetermined increments or predetermined decrements.

8. The controller according to claim 1, wherein the intake air amount is changed by varying an opening degree of a throttle valve by an actuator.

\* \* \* \* \*